(12) United States Patent
Stoerkel et al.

(10) Patent No.: US 9,066,577 B1
(45) Date of Patent: Jun. 30, 2015

(54) INJECTION MOLDED PART

(71) Applicant: Braun GmbH, Kronberg (DE)

(72) Inventors: Jens Stoerkel, Frankfurt (DE); Harald De Buhr, Frankfurt (DE); Lutz Voigtmann, Ober-Morlen (DE); Roland Heckenthaler, Gabsheim (DE)

(73) Assignee: BRAUN GMBH, Kronberg (DE)

( * ) Notice: Subject to any disclaimer, the term of this patent is extended or adjusted under 35 U.S.C. 154(b) by 0 days.

(21) Appl. No.: 14/600,704

(22) Filed: Jan. 20, 2015

Related U.S. Application Data

(63) Continuation of application No. 10/535,436, filed as application No. PCT/EP03/11683 on Oct. 22, 2003, now abandoned.

(30) Foreign Application Priority Data

Nov. 9, 2002 (DE) .................................. 102 52 163

(51) Int. Cl.
| | | |
|---|---|---|
| *B29C 45/17* | (2006.01) | |
| *B44C 1/00* | (2006.01) | |
| *A46B 5/02* | (2006.01) | |
| *B29C 45/00* | (2006.01) | |
| *A46B 15/00* | (2006.01) | |
| *B29L 31/42* | (2006.01) | |

(52) U.S. Cl.
CPC ................ *A46B 5/02* (2013.01); *B29C 45/0003* (2013.01); *A46B 15/0087* (2013.01); *B29L 2031/425* (2013.01); *B29C 45/17* (2013.01); *B44C 1/00* (2013.01)

(58) Field of Classification Search
CPC ............. B29C 45/17; B44C 1/00; A46B 5/02
See application file for complete search history.

(56) References Cited

U.S. PATENT DOCUMENTS

| | | | | | |
|---|---|---|---|---|---|
| 4,089,922 | A | * | 5/1978 | Saito et al. | 264/108 |
| 4,330,578 | A | * | 5/1982 | Nishihira et al. | 428/13 |
| 5,538,410 | A | * | 7/1996 | Yoo et al. | 425/116 |
| 5,968,309 | A | * | 10/1999 | Tarr | 156/701 |
| 6,687,940 | B1 | * | 2/2004 | Gross et al. | 15/167.1 |
| 6,919,038 | B2 | * | 7/2005 | Meyer et al. | 264/36.22 |
| 7,240,390 | B2 | * | 7/2007 | Pfenniger et al. | 15/22.1 |
| 7,297,303 | B2 | * | 11/2007 | Kraemer | 264/243 |

(Continued)

FOREIGN PATENT DOCUMENTS

| | | |
|---|---|---|
| CH | 374196 | 12/1963 |
| CH | 374196 | * 2/1964 |

(Continued)

OTHER PUBLICATIONS

English translation of EPO preliminary opinion in response to opposition filed in corresponding case 03 775 213.6 (undated).*

*Primary Examiner* — Randall Chin
(74) *Attorney, Agent, or Firm* — Vladimir Vitenberg

(57) ABSTRACT

The invention relates to an injection molded part with a basic body 1 injection-molded from plastic, on the surface 2 of which a decoration 4 is two-dimensionally applied and is covered by an encapsulation 7 of plastic by a second injection-molding operation. The basic body 1 consists of a transparent plastic and the decoration 4 is applied with its visible side 5 to the surface 2 of the basic body 1.

24 Claims, 1 Drawing Sheet

(56) References Cited

U.S. PATENT DOCUMENTS

Figure 1:
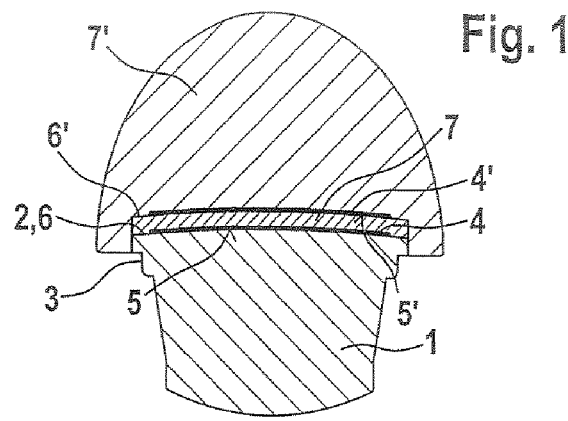

| | | |
|---|---|---|
| 7,415,788 B2 * | 8/2008 | Little et al. ................. 40/314 |
| 2001/0002605 A1 * | 6/2001 | Morawski et al. ............ 156/84 |
| 2002/0081556 A1 * | 6/2002 | Tseng et al. ................. 433/229 |
| 2002/0136790 A1 * | 9/2002 | Buhler ......................... 425/112 |
| 2002/0138931 A1 * | 10/2002 | Davies ........................ 15/167.1 |
| 2003/0135943 A1 * | 7/2003 | Meyer et al. ................ 15/143.1 |
| 2004/0060138 A1 * | 4/2004 | Pfenniger et al. ............ 15/22.1 |
| 2005/0006819 A1 * | 1/2005 | Weihrauch ............... 264/328.12 |
| 2005/0039279 A1 * | 2/2005 | Koeth et al. ................. 15/167.1 |
| 2005/0244582 A1 * | 11/2005 | Weihrauch ................... 427/256 |
| 2006/0123574 A1 | 6/2006 | Storkel et al. |

FOREIGN PATENT DOCUMENTS

| | | | |
|---|---|---|---|
| DE | 197 30 798 | * | 1/1999 |
| DE | 19730798 | | 1/1999 |
| DE | 100 34 839 | * | 1/2002 |
| DE | 10034839 | | 1/2002 |
| EP | 0 805 019 | * | 11/1997 |
| EP | 0805019 | | 11/1997 |
| EP | 1 188 534 | * | 3/2002 |
| EP | 1188534 | | 3/2002 |
| JP | 11075938 | * | 3/1999 |
| WO | WO02/06034 | * | 1/2002 |
| WO | WO0206034 | | 1/2002 |

* cited by examiner

INJECTION MOLDED PART

This application is a continuation of U.S. application Ser. No. 10/535,436, filed Sep. 29, 2005, now abandoned.

The invention relates to an injection molded part, in particular a toothbrush body, with a basic body injection-molded from plastic, on the surface of which a decoration is two-dimensionally applied and is covered by an encapsulation of a plastic by a second injection-molding operation.

In the case of injection molded parts of this type, it is known to apply the decoration with its rear side to the surface of the basic body and subsequently encapsulate it with a clear transparent plastic. After that, the decoration can be seen by an observer through the transparent encapsulation.

The high injection pressure and the high temperature of the plastic of the encapsulation may cause damage to the surface of the visible side of the decoration during the injection-molding operation of the encapsulation.

The object of the invention is therefore to provide an injection molded part of the type stated at the beginning, in the encapsulation of the basic body of which damage to the visible side of the decoration is at least largely avoided.

This object is achieved according to the invention by the basic body consisting of a transparent and/or opaque and/or translucent plastic and the decoration being applied with its visible side to the surface of the basic body.

By this arrangement, the visible side of the decoration is covered by the basic body during the injection-molding operation of the encapsulation, and is consequently protected from damage. The rear side is much less sensitive. Damage to it caused by the injection pressure and thermal loading has at least largely no influence on the visible side of the decoration, so that its decorative effect is not impaired.

The plastic of the encapsulation may be non-transparent. It may, however, also be a transparent and/or opaque and/or translucent plastic.

For simple and secure fastening of the encapsulation to the basic body, the encapsulation may cover one or more decoration-free regions of the basic body with material engagement, which is brought about by the superficial melting of the plastic of the basic body during the encapsulating operation caused by the plastic of the encapsulation.

If the encapsulation covers the basic body without a form fit, fastening of the encapsulation to the basic body takes place by the adhesion of the material engagement alone, which leads to greater freedom in the shaping of the injection molded part.

The plastics of the basic body and the encapsulation may have different degrees of hardness.

The decoration-free regions may be arranged in the edge region of the decoration for the material-engaging connection.

In order that the region of the decoration is encapsulated in such a way that no contaminants can be drawn into gaps between the basic body and the encapsulation in this region, the encapsulation may extend over the basic body fully or partly beyond the edge region of the decoration.

Another possibility for the material-engaging connection is that the decoration-free regions are arranged in the region of the decoration, whereby a secure connection of the encapsulation to the basic body can be achieved even in the case of decorations covering a large surface area.

If the connection between the basic body and the encapsulation is to be made even more secure, the basic body may have in one or more of the decoration-free regions recesses which are open toward its surface and are filled by the plastic of the encapsulation, since the surface area of the encapsulated decoration-free regions is increased in this way.

At the same time, the recess may represent one or more alphanumeric characters or symbols, such as for example a company logo.

The surface of the basic body bearing the decoration may be either planar or else convexly curved.

In order to avoid damage to the tools that are used for applying the decoration, for example when printing the decoration on by means of a pad stamp, the region of the surface of the basic body surrounding the decoration can be formed at a lower-lying level than the surface area covered by the decoration, which can be achieved in a simple way by the region of the surface of the basic body surrounding the decoration being formed in a convexly rounded manner. In this way, an enlargement of the decoration-free region which can be encapsulated is at the same time achieved.

The convex rounding may in this case extend into the outer edge region of the surface of the basic body bearing the decoration.

The decoration may be formed in a wide variety of ways. For instance, the decoration may be an insert part or a hot transfer film or a metallized film.

The decoration may also be applied to the surface of the basic body by printing, in particular by pad printing or screen printing or laser printing or inkjet printing.

To produce a complicated multilayered image, a further decoration may be applied to the encapsulation and be covered by a further encapsulation, which covers one or more regions of the first encapsulation that are free from the further decoration with material engagement with respect to the first encapsulation.

It is also possible, however, that after each encapsulation a further decoration is applied spatially behind an already encapsulated decoration and is covered by a further encapsulation.

Figure 2:
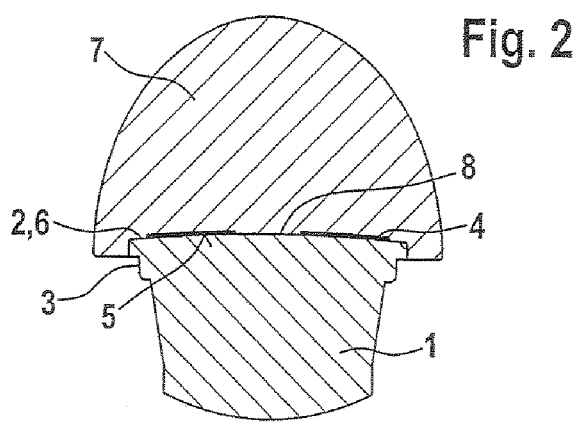
Figure 3:
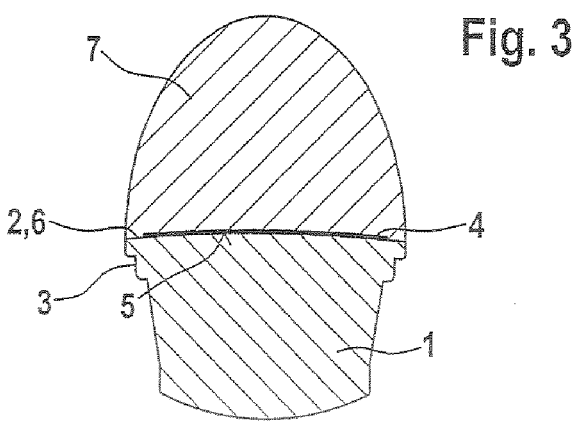

Exemplary embodiments of the invention are described in more detail below and are represented in the drawing, in which:

FIG. 1 shows a cross section of a first exemplary embodiment of an injection molded part, FIG. 2 shows a cross section of a second exemplary embodiment of an injection molded part, FIG. 3 shows a cross section of a third exemplary embodiment of an injection molded part.

The injection molded parts represented in the figures are toothbrush bodies. In principle, the subject matter of the invention can be used in the case of any type of injection molded part. So, the injection molded parts may also be, for example, housings of electric razors, wet razors or housings of domestic appliances.

The injection molded parts represented have a basic body 1, which was produced in a first operation from a transparent plastic by injection molding. The upwardly directed surface 2 of the basic body 1 is convexly curved.

Printed onto the surface 2 by pad printing is a decoration 4, the visible side 5 of which is directed toward the surface 2 of the basic body 1 and can be seen by an observer through the transparent basic body 1.

Since the surface area of the decoration 4 is smaller than the surface 2, a decoration-free edge region enclosing the decoration 4 is formed on the surface 2.

For an encapsulating operation, the basic body 1 was placed into an overmolding tool, for which purpose the basic body 1 is provided at its peripheral side wall, enclosing the surface 2, with a peripheral shoulder 3 serving for acceptance in the overmolding tool.

In the encapsulating operation, the basic body 1, the decoration 4 and the decoration-free edge region 6 have been provided with an encapsulation 7 in a covering manner. In FIG. 2, this encapsulation 7 also covers over a further decoration-free region 8 within the region of the decoration 4. Where the encapsulation 7 covers the decoration-free edge region 6 and the decoration-free region 8, a material engagement between the materials of the basic body 1 and of the encapsulation 7 has been produced by the encapsulating operation and has the effect of connecting these two parts firmly to each other.

In the case of the exemplary embodiment of FIG. 1, the encapsulation 7 is transparent and on it, over the decoration, a further decoration 4' has been applied by pad printing with its visible side 5' directed toward the basic body 1 and covered in a further encapsulating operation by a further encapsulation 7'. This also involves the second decoration 4' being enclosed by a decoration-free edge region 6' of the first encapsulation, the further encapsulation 7' also extending over the further edge region 6', so that the further encapsulation 7' is connected to the encapsulation 7 by material engagement of the materials of these two parts to each other.

The further decoration 4' can also be seen by an observer through the transparent basic body 1 and the transparent encapsulation 7'.

In the case of the exemplary embodiments of FIGS. 1 and 2, the encapsulation 7 and 7' extends beyond edge regions 6 and 6', respectively, into the region of the side wall, while in the case of the exemplary embodiment of FIG. 3 the encapsulation 7 covers only the decoration 4 and the edge region 6 of the surface 2.

The invention claimed is:

1. An injection molded part comprising:
   a body injection-molded from a first plastic, the body having a decoration-bearing surface, wherein the body comprises a plastic selected from the group consisting of transparent material, opaque material, translucent material, and any combination thereof; and
   a decoration having a decorative visible side and a rear side, wherein the decoration is applied with the visible side to the decoration-bearing surface of the body, such that the decorative visible side is protected from damage during a subsequent injection-molded encapsulation of a second plastic covering the decoration, and wherein the decoration-bearing surface is convexly curved.

2. The injection molded part as claimed in claim 1, wherein the encapsulation covers one or more decoration-free regions of the body with the first and second plastics bonded to each other.

3. The injection molded part as claimed in claim 2, wherein the first and second plastics have different degrees of hardness.

4. The injection molded part as claimed in claim 2, wherein the decoration-free regions are arranged in an edge region adjacent the decoration.

5. The injection molded part as claimed in claim 4, wherein the encapsulation extends over the body beyond the edge region adjacent the decoration.

6. The injection molded part as claimed in claim 2, wherein the decoration-free regions are arranged in an interior region of the decoration.

7. The injection molded part as claimed in claim 2, wherein the body has, in one or more of the decoration-free regions, recesses which are open toward its surface and are filled by the second plastic of the encapsulation.

8. The injection molded part as claimed in claim 1, wherein an edge region of the surface of the body surrounding the decoration is formed at a lower-lying level than the surface covered by the decoration.

9. The injection molded part as claimed in claim 8, wherein the edge region of the surface of the body surrounding the decoration is formed in a convexly rounded manner.

10. The injection molded part as claimed in claim 1, wherein the decoration is applied by means of a hot transfer film, or by means of a metallized film.

11. The injection molded part as claimed in claim 1, wherein the decoration is applied to the surface of the body by printing.

12. The injection molded part as claimed in claim 1, further comprising:
    a further decoration applied to the encapsulation; and
    a further encapsulation, which covers one or more regions of the first encapsulation that are free from the further decoration with the second encapsulation bonded to the first encapsulation.

13. The injection molded part of claim 1, wherein the part is a toothbrush body.

14. The injection molded part of claim 1, wherein the part is a toothbrush body and the encapsulation covers one or more decoration-free regions of the toothbrush body with the first and second plastics bonded to each other.

15. A method of injection molding a part, the method comprising:
    injection molding a body from a first plastic, the body comprising a transparent or translucent plastic, the body having a convex surface configured to receive at least a two-dimensional decoration thereon;
    applying the at least two-dimensional decoration to the convex surface of the body, the decoration having a decorative visible side and a rear side, wherein the decoration is applied with its decorative visible side to the convex surface of the body, such that the decorative visible side is visible through the body, wherein the surface bearing the decoration is convexly curved; and
    covering the applied decoration with an encapsulating layer of a second plastic, the second plastic injection molded over the rear side of the decoration.

16. The method as claimed in claim 15, wherein the encapsulating layer covers a decoration-free region of the body and the first plastic bonds with the second plastic in the decoration-free region.

17. The method as claimed in claim 16, wherein the first and second plastics have different degrees of hardness.

18. The method as claimed in claim 16, wherein the decoration-free region is an edge region adjacent the decoration.

19. The method as claimed in claim 18, wherein the encapsulating layer extends over the body beyond the edge region.

20. The method as claimed in claim 16, wherein the decoration-free region is arranged in an interior region defined within the decoration.

21. The method as claimed in claim 16, wherein the body has a recess in the form of one or more alphanumeric characters or symbols in the decoration-free region which are open toward the body surface and are filled by the plastic of the encapsulating layer.

22. The method as claimed in claim 15, wherein an edge region of the surface surrounding the decoration is formed at a lower-lying level than a covered region of the surface under the decoration.

23. The method as claimed in claim 15, further comprising:
    applying a further decoration applied to the encapsulating layer; and injection molding a second encapsulating layer covering at least a region of the first encapsulating layer that is free from the further decoration;
wherein the second encapsulating layer bonds with the first encapsulating layer.

24. The method of claim 15, wherein the part is a toothbrush body.

\* \* \* \* \*